United States Patent Office 3,586,711
Patented June 22, 1971

3,586,711
ESTERS OF ACRYLIC AND METHACRYLIC ACIDS WITH POLYAMINO ALCOHOLS
Mikhail Alexeevich Korshunov, Ulitsa Pervomaiskaya 9, kv. 41; Friziyan Nikolaevich Bodnarjuk, Ulitsa Tolbukhina 40, kv. 40; Vadim Emmanuilovich Lazaryants, Ulitsa Radischeva 13, kv. 9; Anatoly Mikhailovich Kutiin, Ulitsa Grazhdanskaya 41, kv. 6; Klavdia Nikolaevna Malkova, Pr. Lenina 30, kv. 44; and Nikolai Arkadievich Preobrazhensky, Pr. Lenina 36, kv. 41, all of Yaroslavl, U.S.S.R.
No Drawing. Filed May 1, 1967, Ser. No. 634,922
Int. Cl. C07c 69/54
U.S. Cl. 260—486     1 Claim

ABSTRACT OF THE DISCLOSURE

A series of esters of acrylic and methacrylic acid containing in their alcohol residue two or three tert-alkyl-amino or tert-amino groups of various structures. There are disclosed different methods for their production: by the reaction of di- or triaminoalkanols with acrylic or methacrylic acids, their chlorides or lower alkyl esters.

This invention relates to novel esters of $\alpha,\beta$-unsaturated acids and to methods of manufacturing the same. More particularly, the invention relates to a method for the preparation of novel esters of acrylic and methacrylic acids containing several amino groups in the alkoxyl radical.

The compounds of this type are monomers whose molecule has easily polymerizing double bonds and contains several secondary or tertiary amino groups. When copolymerized with other vinyl monomers, small quantities of acrylates or methacrylates containing only one amino group in the alkoxyl radical are known to confer on the polymeric compounds thus obtained good mechanical properties, high adhesion to diverse materials, improved dyeability, and better resistance to temperature shocks. Highly basic anionites can be derived from such acrylates or methacrylates.

It is apparent, that the monomers containing more than one amino group would exert a similar, but more pronounced effect. For example, ion-exchange resins derived from monomers that contain several amino groups and, hence, have a high content of amino nitrogen would possess a higher ion exchange capacity than ion-exchange resins prepared from esters of unsaturated acids containing one amino group per monomeric molecule.

Heretofore, no esters of $\alpha,\beta$-unsaturated acids containing more than one amino group in the alkoxy radical have been known.

It is an object of the present invention to provide esters of $\alpha,\beta$-unsaturated acids that contain several secondary or tertiary amino groups in the alkoxyl radical.

It is another object of the present invention to provide simple and economical methods of manufacturing the monomers of the above type which lend themselves to commercial application.

These and other objects have been accomplished, according to the present invention, by reacting polyamino monohydric alcohols having the general formula A—OH with $\alpha,\beta$-unsaturated acids having the general formula $$CH_2=\overset{R}{\underset{|}{C}}-COOH$$

or with chlorides of said unsaturated acids, $$CH_2=\overset{R}{\underset{|}{C}}-COCl$$

or with lower alkyl esters of said unsaturated acids having the general formula $$CH_2=\overset{R}{\underset{|}{C}}-\overset{O}{\underset{||}{C}}-OR^0$$

wherein R is hydrogen or a methyl radical, $R^0$ is an alkyl radical containing up to 4 carbon atoms, and A stands for

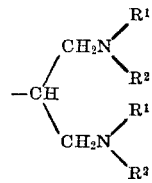

or

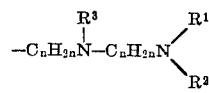

or

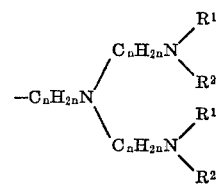

wherein

represents a radical selected from the series comprising secondary aliphatic, tertiary aliphatic and heterocyclic amino groups having from 2 to 12 carbon atoms; $R^3$ represents an alkyl radical having up to 6 carbon atoms, and $n$ represents 2 or 3.

Acrylic and methacrylic acids as well as chlorides and lower alkyl esters thereof required for the manufacture of monomers of the type specified above are readily available commercial products. Polyamino monohydric alcohols can be prepared from readily available commercial products. 1,3-bisaminoisopropanols are prepared by reaction appropriate amines with epichlorohydrin in accordance with the general reaction scheme set forth below:

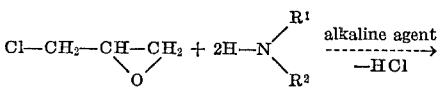

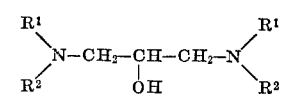

In place of epichlorohydrin, use can be made of $\alpha,\gamma$-dichlorohydrin

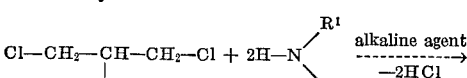

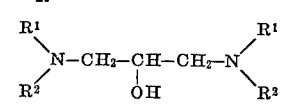

N - alkyl - N - (aminoalkyl) - aminoalkanols are prepared by alkylating appropriate alkylaminoalkanols with aminoalkyl halides in the presence of alkaline agents according to the following reaction scheme:

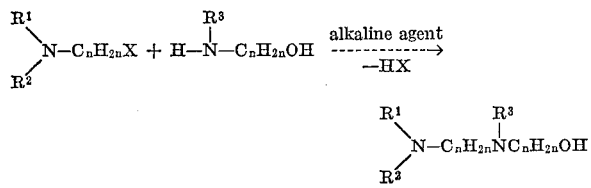

wherein X stands for chlorine, bromine or iodine.

N,N - bis - (aminoalkyl) - aminoalkanols are synthesized by alkylating alkanolamines with aminoalkyl halides according to the following reaction scheme:

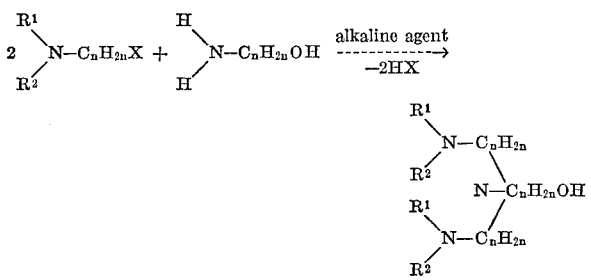

wherein X stands for chlorine, bromine or iodine.

Esterification of $\alpha,\beta$-unsaturated acids is carried out as follows. Into a reaction vessel fitted with a stirrer, a thermometer, and a reflux condenser with a water trap are charged an amino alcohol, acrylic or methacrylic acid, a solvent for azeotropic distillation of the water formed, an esterification catalyst, and a polymerization inhibitor. The reaction mixture is refluxed with stirring until aqueous layer ceases to separate in the water trap, and thereafter cooled to room temperature and treated with an alkaline agent to neutralize the unreacted unsaturated acid, next the solvent is distilled off and the residue is fractionated in vacuum. The reaction may be carried out at ambient, elevated or reduced pressure and in an atmosphere of air, nitrogen or some other gas that is indifferent to the components of the reaction mixture. The temperature of the reaction mixture depends upon the solvents and amino alcohol used, but it is usually maintained in the 80 to 200° C. range. The esterification catalysts comprise sulfuric acid, ferric and aluminum sulfates, sodium bisulfate, and metallic sodium. The preferred esterification catalysts are ferric and aluminum sulfates in hydrated form taken in an amount of 0.1 to 10% by weight based on the weight of the reagents used.

Use is made of the following solvents: benzene, toluene, xylenes and other solvents capable of forming azeotropic mixtures with water. The polymerization inhibitors used include para-hydroxydiphenylamine, diphenyl-para-phenylenediamine, phenothiazine and other aromatic amines, as well as phenols and naphthols.

The monomeric polyamino esters of $\alpha,\beta$-unsaturated acids are obtained by the present method in a yield of 60–70% of the theoretical amount.

When recourse is had to chlorides of $\alpha,\beta$-unsaturated acids to acylate appropriate polyamino monohydric alcohols, the product compounds, viz., monomeric polyaminoesters, are obtained in a yield better than 90% of the theoretical amount. The reaction is carried out as follows. To a solution of the chloride of an $\alpha,\beta$-unsaturated acid in an anhydrous solvent (benzene, toluene, diethyl ether, acetonitrile, dimethylformamide, etc.), maintained at a temperature of 0° to 120° C. (preferably at 20 to 80° C.) and containing a polymerization inhibitor, is gradually added, with stirring, a solution of the stochiometric quantity of a polyamino monohydric alcohol in the same solvent. In order to bring the reaction to completion, stirring the reaction mixture at elevated temperature is continued for a short period of time. To liberate the free base of the monomeric polyaminoester from the monohydrochloride formed as a result of the reaction, the reaction products should be treated with an aqueous or alcoholic solution of alkali or alkali earth metal carbonates or hydroxides. A solution of the free base of the product ester in an organic solvent is separated from an aqueous solution of the metal salt (where the reaction products have been treated with an aqueous solution of the alkaline agent) or freed from a metal chloride sediment by filtration (in case neutralization of the reaction products has been effected with an alcoholic solution), and thereafter fractionated.

In some instances it is expedient to carry out acylation in the presence of compounds capable of combining the hydrogen chloride formed in the course of the reaction, pyridine, triethylamine and other tertiary amines being suitable for this purpose. Acylation may likewise be carried out in the absence of a polymerization inhibitor which in this case should be added at the step of rectifying the product compound.

In accordace with the present invention, the most effective procedure for the preparation of monomeric polyaminoesters of $\alpha,\beta$-unsaturated acids comprises transesterification of lower alkyl esters of said acids with corresponding polyaminoalcohols. The procedure involves heating a mixture of a polyamino monohydric alcohol, a lower alkyl ester of an $\alpha,\beta$-unsaturated acid, taken preferably in excess, and a polymerization inhibitor in a reaction vessel connected to a rectifying column, and adding to the reaction mixture a transesterification catalyst once the mixture attains the desired temperaure. Where the starting reagents contain some moisture, a small quantity of the alkyl ester of the unsaturated acid should be distilled off prior to adding the transesterification catalyst to the reaction mixture so that the water present in the reaction mixture will be removed in the form of an azeotrope with the starting ester. The required amount of the catalyst is added all at once or in small portions throughout the transesterification step. The lower alkanol formed is removed in the form of an azeotropic mixture with the starting alkyl ester. The reaction is carried out at a temperature sufficiently high for rapid distillation of the azeotropic mixture. The temperature of the azeotropic mixture is usually maintained in the 60 to 160° C. range, preferably in the 80 to 130° C. range. The reaction is carried out at ambient, elevated or reduced pressure in an atmosphere of air, nitrogen or some other gas that is inert to the reaction mixture components. When the lower alkanol has been distilled off in a nearly theoretical amount, the product polyaminomonoester of the $\alpha,\beta$-unsaturated acid is isolated by distillation in vacuum or by other appropriate techniques.

The transesterification catalysts include alkali metals and alkoxides thereof, as well as alkoxides of other metals, e.g. titanium and aluminum alkoxides, the most effective and convenient catalysts being sodium methoxide in the form of a 25–30% solution in dry methanol and titanium tetra-n-butoxide. It is expedient to employ said catalysts in an amount of 0.1–10 mol. percent, preferably in an amount of 1–5 mol. percent, based on the amino alcohol used.

The group of useful polymerization inhibitors comprises phenols, aromatic amines, and aminophenols, e.g., hydroquinone, 2,6 - di(tert.butyl) - 4 - methyl phenol (ionol), pyrocatechol, tert-alkylpyrocatechol, $\beta,\beta'$-dihydroxy-$\alpha,\alpha'$-dinaphthyl (di-$\beta$-naphthol), phenyl-$\beta$-naphthylamine, N,N'-diphenyl-paraphenylenediamine, thiodiphenylamine (phenothiazine).

Transesterification under the conditions disclosed hereinabove render it possible to prepare monomeric polyamino esters of $\alpha$-$\beta$-unsaturated acids in a yield of 80–90% of the theoretical amount based on the polyamino alcohol introduced into the reaction mixture.

The present method was instrumental in synthesizing polyaminomonoesters of α,β-unsaturated acids having the following structural formula:

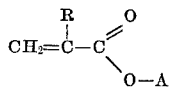

wherein R is a radical selected from the group consisting of hydrogen and methyl; A stands for a radical selected from the group which consists of

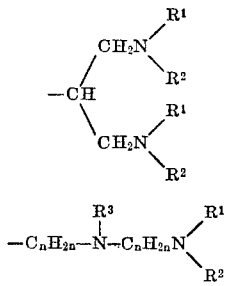

and

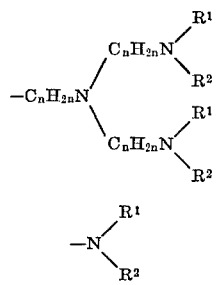

is a radical selected from the series which consists of secondary aliphatic, tertiary aliphatic and heterocyclic amino groups having from 2 to 12 carbon atoms, e.g., —N(CH$_3$)$_2$, —N(C$_2$H$_5$)$_2$, —N(CH$_2$—CH=CH$_2$)$_2$,

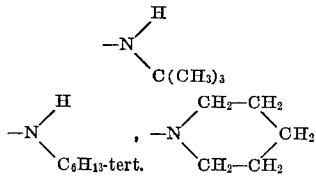

and

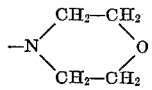

R$^3$ stands for an alkyl radical having up to 6 carbon atoms, and n represents 2 or 3.

The following novel compounds have been synthesized:

1,3-bis-(dimethylamino)-isopropyl methacrylate
CH$_2$=C(CH$_3$)COOCH[CH$_2$N(CH$_3$)$_2$]$_2$;
1,3-bis-(dimethylamino)-isopropyl acrylate
CH$_2$=CHCOOCH[CH$_2$N(CH$_3$)$_2$]$_2$;
1,3-bis-(diethylamino)-isopropyl methacrylate
CH$_2$=C(CH$_3$)COOCH[CH$_2$N(C$_2$H$_5$)$_2$]$_2$;
1,3-bis-(diethylamino)-isopropyl acrylate
CH$_2$=CHCOOCH[CH$_2$N(C$_2$H$_5$)$_2$]$_2$;
1,3-bis-(diallylamino)-isopropyl methyacrylate
CH$_2$=C(CH$_3$)COOCH[CH$_2$N(CH$_2$—CH=CH$_2$)$_2$]$_2$;
1,3-bis-(diallylamino)-isopropyl acrylate
CH$_2$=CHCOOCH[CH$_2$N(CH$_2$—CH=CH$_2$)$_2$]$_2$;
1,3-di-(N-piperidyl)-isopropyl methacrylate

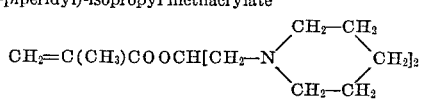

1,3-di-(N-piperidyl)-isopropyl acrylate

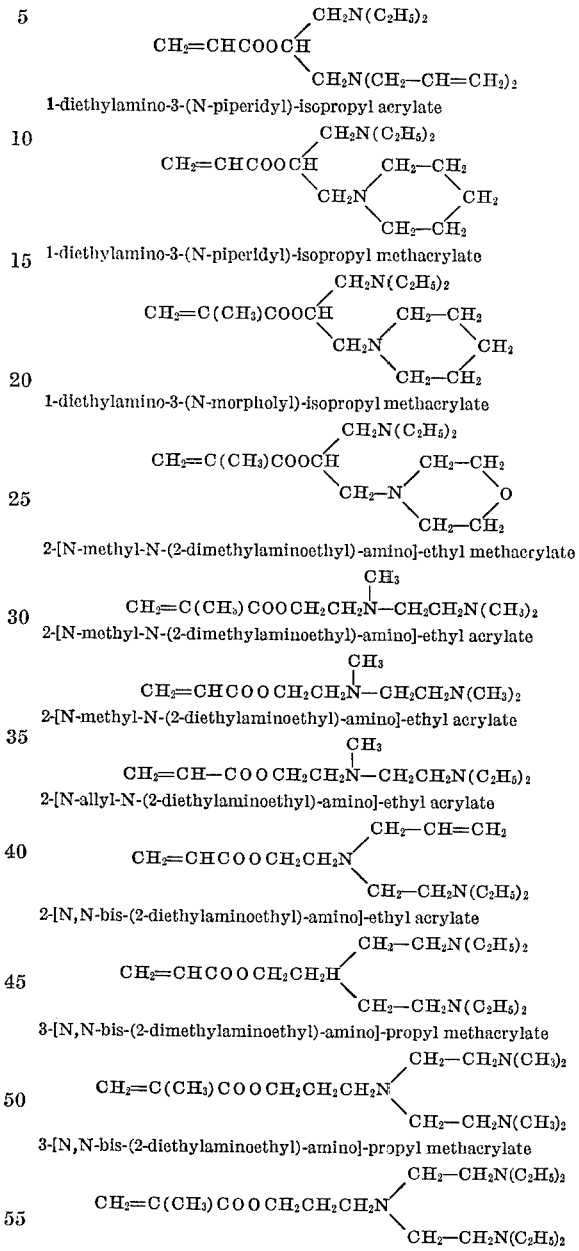

Acrylic and methacrylic esters of and esters polyamino monohydric alcohols prepared according to the present invention are colorless liquids which are soluble in organic solvents.

Esters, which contain dimethylamino groups, are readily soluble in water, whilst the solubility of other esters in water diminishes markedly with the increasing chain length of substituents at nitrogen atoms in the amino groups. When mixed with methyl iodide, amino esters containing tertiary amino groups yield appropriate quaternary salts. To obtain hydrochlorides of amino esters, dry hydrogen chloride should be bubbled through amino esters dissolved in organic solvents.

Hydrochlorides and alkoiodides of the esters of the present invention are colorless crystals which are readily soluble in water. Picrates can be crystallized from alcoholic solutions in the form of yellow crystals.

In the presence of azo-diisobutyrodinitrile and at an elevated temperature (40 to 100° C.), the monomeric polyamino esters undergo rapid polymerization yielding colorless, transparent polymers which vary in hardness from a soft resin to a hard, glassy resin. Polymerization of the obtained monomeric esters, in the course of storage, is prevented by adding small amount (0.05 to 0.5% by weight) of the same polymerization inhibitors as those used in the process of manufacturing said esters.

The present invention makes it possible to obtain in high yields the esters of $\alpha,\beta$-unsaturated acids and polyamino monohydric alcohols by a method which can be readily adapted on an industrial scale.

For a better understanding of the present invention, the following examples are presented by way of illustration.

EXAMPLE 1

1,3-bis-(dimethylamino)-isopropyl-methacrylate

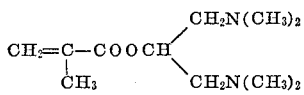

Into a flask connected to a fractionating column having an efficiency of ca. 10 perfect plates are charged 72 g. of 1,3-bis-(dimethylamino)-isopropanol, 150 g. of technical methyl methacrylate, and 1.5 g. of para-hydroxy-diphenylamine. The reaction mixture is heated to 90° C. on an oil bath, and then to it is added 0.5 ml. of a 25% solution of sodium methoxide in dry methanol. The catalyst is further added to the reaction mixture every 5–10 minutes in an amount of 0.1 to 0.2 ml. until the total amount of the catalyst added reaches 3 to 4 ml. The temperature of the oil bath is maintained at 120 to 140° C. throughout the entire reaction period.

The methanol formed in the course of the reaction is distilled off as an azeotrope with methyl methacrylate at a vapor temperature of 64–66° C. The content of methanol in the mixture is estimated by the refractometric technique. A nearly theoretical amount of methanol is formed in the course of 2.5 to 3 hours. Next the reaction mixture is cooled to room temperature; filtered from traces of a precipitate and fractionated through a short column under reduced pressure. Upon separation of the unreacted methyl methacrylate, the material that distils at 117–117.5° C./20 mm. consists of pure 1,3-bis-(dimethylamino)-isopropyl methacrylate.

The yield is 95.7 g. (89.4% of the theoretical amount); $n_D^{20}$ 1.4475; $d_4^{20}$ 0.9239; $MR_D$ 62.00; $MR_{calcd.}$ 62.06.

*Analysis.*—Found (percent): N, 12.98; 12.87. Calcd. for $C_{11}H_{22}N_2O_2$ (percent): N, 13.07.

To identify the esters obtained, it is reacted with methyl iodide.

Dimethiodide colorless crystals (from ethanol); M.P. 218–219° C. (with decomp.).

*Analysis.*—Found (percent): N, 5.63; 5.73. Calcd. for $C_{13}H_{28}I_2N_2O_2$ (percent): N, 5.62.

EXAMPLE 2

1,3-bis-(dimethylamino)-isopropyl acrylate

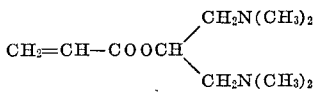

Into a 4-necked flask fitted with a mechanical stirrer, a thermometer, a dropping funnel, and a reflux condenser with calcium chloride tubes are placed 18.2 g. of acryloyl chloride, 0.5 g. of para-hydroxydiphenylamine, and 100 ml. of dry benzene. A solution of 29.2 g. of 1,3-bis-(dimethylamino)-isopropanol in 20 ml. of dry pyridine is added within 30 minutes, with stirring, to the reaction mixture maintained at 25–30° C. The mitxure is heated to 80° C. and stirred for an additional hour, followed by cooling the mixture to room temperature and adding, also with stirring, a solution of 11.5 g. of potassium hydroxide in 40 ml. of methanol. The precipitate that forms is removed by filtration and the filtrate is distilled in vacuum to yield 30.1 g. of 1,3-bis-(dimethylamino)-isopropyl acrylate (75.3% of the therotical amount); B.P. 99–100°/18 mm.; $n_D^{20}$ 1.4478; $d_4^{20}$ 0.9290; $MR_D$ 57.69; $MR_{calcd.}$ 57.45.

*Analysis.*—Found (percent): N, 13.70; 13.87. Calcd. for $C_{10}H_{20}N_2O_2$ (percent): N, 13.98.

Dimethiodide: M.P. 200–201° C. (from ethanol).

*Analysis.*—Found (percent): N, 5.57. Calcd. for $C_{12}H_{26}I_2N_2O_2$ (percent): N, 5.78.

EXAMPLE 3

1,3-bis-(dimethylamino)-isopropyl methacrylate

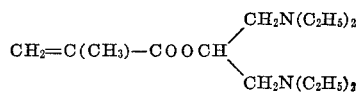

(a) Into the transesterification reaction vessel described in Example 1 are placed 101 g. of 1,3-bis-(diethylamino)-isopropanol, 1.5 g. of para-hydroxydiphenylamine, and 150 g. of methyl methacrylate. The reaction mixture is heated to 90° C. and to it is added 1 ml. of a 25% solution of sodium methoxide in dry methanol, followed by adding the catalyst in 0.2-ml. portions every 10 min. The total amount of the catalyst solution incorporated during 2 hours equals 3.2 ml., and 24.4 of an azeotropic mixture containing 17.8 g. of methanol is distilled during the same period. After filtering and distilling in vacuum the reaction products, 1,3-bis-(diethylamino)-isopropyl methacrylate is obtained in a yield of 115.2 g. (85.4% of the theoretical amount; B.P. 118–120° C./6 mm.; $n_D^{20}$ 1.4528; $d_4^{20}$ 0.9104; $MR_D$ 80.26; $MR_{calcd.}$ 80.53.

*Analysis.*—Found (percent): N, 10.30; 10.48. Calcd. for $C_{15}H_{30}N_2O_2$ (percent): N, 10.37.

(b) Into a round-bottomed flask fitted with a stirrer, a thermometer, and a reflux condenser with a water trap, are charged 60.5 g. of 1,3-bis-(dimethylamino)-isopropanol, 50 ml. of m-xylene, 2 g. of diphenyl-para-phenylenediamine, 3 g. of ferric sulfate, $Fe_2(SO_4)_3 \cdot 9H_2O$, and 28.4 g. of methacrylic acid. The temperature of the reaction mixture rises spontaneously to 50° C. The mixture is then boiled with stirring at 150–170° C. for 3 hours, and 5.3 ml. of an aqueous phase containing a small amount of methacrylic acid collects during this period in the trap. Next the reaction mixture is cooled to room temperature, washed with an aqueous solution of potassium carbonate and fractionated through a short column under reduced pressure. Upon removal of m-xylene, there distils the unchanged 1,3-bis-(diethylamino)-isopropanol (11.5 g., B.P. 84–87° C./3 mm.; $n_D^{20}$ 1.4770), next distils a small intermediate fraction (2.5 g.; B.P. 87–108° C./3 mm.; $n_D^{20}$ 1.4498), and finally collects pure 1,3-bis-(diethylamino)-isopropyl methacrylate (B.P. 108–112° C./3 mm.; $n_D^{20}$ 1.4528). The diamino ester is obtained in a yield of 57.1 g. (70.4% based on the diamino alcohol charged or 92.3% based on the converted diamino alcohol).

EXAMPLE 4

1,3-bis-(diethylamino)-isopropyl acrylate

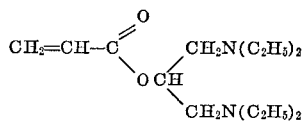

(a) Into the reaction vessel described in Example 2 are charged 70 ml. of dry benzene, 10 g. of acryloyl chloride, and 1 g. of para-hydroxydiphenylamine. Then to the mixture is added, with striring, during 30–40 minutes a solution of 20.2 g. of 1,3-bis-(diethylamino)-isopropanol in 30 ml. of benzene, the temperature of the reaction mixture being maintained below 50° C. In 15 minutes after adding all the diamino alcohol, 11 g. of triethylamine is incorporated into the reaction mixture, which is stirred additionally for 30 minutes, and cooled thereafter to room temperature. Then to it is added a solution of 6 g. of potassium hydroxide in 30 ml. water. This results in reaction mixture layering. The organic layer is washed twice with water. Next the solvents are removed by distillation, and the residue is fractionated in vacuum. The yield of 1,3-bis-(diethylamino)-isopropyl acrylate is 23.8 g. (93.1% of the theoretical amount); B.P. 87–88° C./1 mm.; $n_D^{20}$ 1.4510; $d_4^{20}$ 0.9124. $MR_D$ 75.71; $MR_{calcd.}$ 75.92.

*Analysis.*—Found (percent): N, 10.88; 10.90. Calcd. for $C_{14}H_{28}N_2O_2$ (percent): N, 10.93.

Dimethiodide: M.P. 185–186° C. (from ethanol).

*Analysis.*—Found (percent): N, 5.09; 5.23. Calcd. for $C_{16}H_{34}I_2N_2O_2$ (percent): N, 5.19.

(b) Into a round-bottomed flask fitted with a thermometer, a reflux condenser with a water trap, and a tube that reaches nearly to the flask bottom and serves for gas delivery, are placed 101 g. of 1,3-bis-(diethylamino)-isopropanol, 50 g. of m-xylene, 3 g. of hydrated aluminum sulfate, $Al_2(SO_4)_3 \cdot 18H_2O$, 4 g. of diphenyl-para-phenylenediamine, and 36 g. of acrylic acid. The temperature of the reaction mixture rises to 55° C. Dry nitrogen is then bubbled through the reaction mixture which is boiled on an oil bath. The water that forms in the course of the reaction and contains an admixture of acrylic acid is collected in the trap, from which it is periodically removed. The total amount of the aqueous phase that distils at a temperature of 140–155° C. during 5 hours is 15.6 ml. Next the reaction mixture is cooled to room temperature and treated, while continuing to purge the mixture with nitrogen, with a 40% aqueous solution of sodium hydroxide, followed by washing the organic layer with a sodium chloride solution, drying it over anhydrous magnesium sulfate, and distilling through a short column. Distillation yields 10.2 g. of unreacted diamino alcohol, a small intermediate fraction, and 77.45 g. of 1,3-bis-(diethylamino)-isopropyl acrylate (60.5% of the theoretical amount); B.P. 86–89° C./1 mm.; $n_D^{20}$ 1.4513. The diamino ester is obtained in a yield of 75.7% based on the converted diamino alcohol.

EXAMPLE 5

1,3-bis-(diallylamino)-isopropyl methacrylate

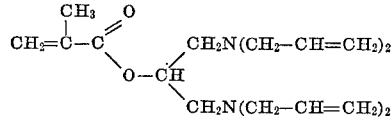

25.0 g. of 1,3-bis-(diallylamino)-isopropanol and 30 g. of methyl methacrylate in the presence of 1 g. of di-β-naphthol and sodium methoxide yield, under the conditions disclosed in Example 1, 30.1 g. of 1,3-bis-(diallylamino)-isopropyl methacrylate (94.7% of the theoretical amount); B.P. 136–138° C./2 mm.; $n_D^{20}$ 1.4778; $d_4^{20}$ 0.9278. $MR_D$ 97.06; $MR_{calcd.}$ 97.14.

*Analysis.*—Found (percent): N, 8.76; 9.02. Calcd. for $C_{19}H_{30}N_2O_2$ (percent): N, 8.79

EXAMPLE 6

1,3-bis-(diallylamino)-isopropyl acrylate

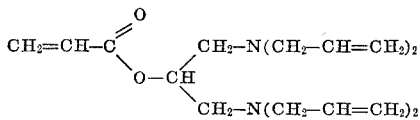

To a solution of 10 g. of acryloyl chloride in 100 ml. of dry benzene, placed in a reactor described in Example 2, is added with stirring, for a period of 40 minutes a solution of 25 g. of 1,3-bis-(diallylamino)-isopropanol in 30 ml. of benzene, the temperature of the reaction mixture being kept at about 50° C. Next the reaction mixture is heated to a temperature of 75–80° C. and stirred for an additional hour; it is then cooled to room temperature and treated with 100 g. of a 10% aqueous solution of potassium hydroxide. The organic layer that separates is washed with water; after the addition of 0.5 g. of di-β-naphthol, benzene is removed by distillation, and the residue is fractionated in vacuum. 1,3-bis-(diallylamino)-isopropyl acrylate is obtained in a yield of 27.1 g. (89.1% of the theoretical amount); B.P. 135–137° C./2.5 mm.; $n_D^{20}$ 1.4788; $d_4^{20}$ 0.9390. $MR_D$ 91.90; $MR_{calcd.}$ 92.52.

*Analysis.*—Found (percent): N, 9.25; 9.28. Calcd. for $C_{18}H_{28}N_2O_2$ (percent): N, 9.21.

EXAMPLE 7

1,3-di-(N-piperidyl)-isopropyl methacrylate

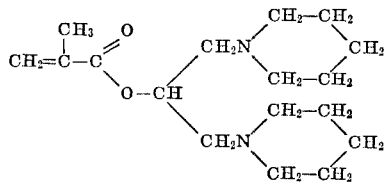

The reaction is carried out by following the procedure disclosed in Example 1. From 67.8 g. of 1,3-di-(N-piperidyl)-isopropanol and 90 g. of methyl methacrylate is obtained 75.5 g. of 1,3-di-(N-piperidyl)-isopropyl methacrylate (85.6% of the theoretical amount). The reaction comes to completion within 3 to 3.5 hours. The product boils at 132–133° C./1 mm.; $n_D^{20}$ 1.4844; $d_4^{20}$ 0.9808.

*Analysis.*—Found (percent): N, 9.27; 9.41. Calcd. for $MR_D$ 85.86; $MR_{calcd.}$ 85.37. $C_{17}H_{30}N_2O_2$ (percent): N, 9.51.

EXAMPLE 8

1,3-di-(N-piperidyl)-isopropyl acrylate

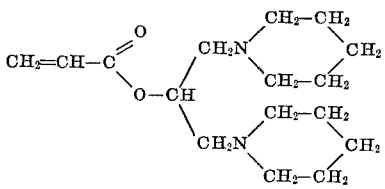

(a) 10 g. of acryloyl chloride and 22.6 g. of 1,3-di-(N-piperidyl)-isopropanol interacted under the conditions disclosed in Example 6, yield 25.4 g. of 1,3-di-(N-piperidyl)-isopropyl acrylate (90.6% of the theoretical amount); B.P. 114° C./0.4 mm.; $n_D^{20}$ 1.4859; $d_4^{20}$ 0.9974. $MR_D$ 80.71; $MR_{calcd.}$ 80.75.

*Analysis.*—Found (percent): N, 9.67; 9.86. Calcd. for $C_{16}H_{28}N_2O_2$ (percent): N, 9.99.

(b) 113 g. of 1,3-di-(N-piperidyl)-isopropanol and 39.5 g. of acrylic acid interacted by following the procedure disclosed in Example 4b, give 88.65 g. of 1,3-di-(N-piperidyl)-isopropyl acrylate (63.3% of the theoretical amount); B.P. 115–116° C./0.5 mm.; $n_D^{20}$ 1.4860.

EXAMPLE 9

1,3-di-(tert.butylamino)-isopropyl methacrylate

In the same manner as disclosed in Example 1, 72.1 g. of 1,3-di-(tert.butylamino)-isopropanol is reacted with 100 g. of methyl methacrylate in the presence of 2 g. of di-β-naphthol and sodium methoxide to give 71.2 g. of 1,3-di-(tert.butylamino)-isopropyl methacrylate (74.5% of the theoretical amount); B.P. 104–108° C./1 mm.; $n_D^{20}$ 1.4470.

*Analysis.*—Found (percent): N, 10.08; 10.15. Calcd. for $C_{15}H_{30}N_2O_2$ (percent): N, 10.37. Neutralization equivalent found, 135.5; neutralization equivalent calcd., 135.

Dipicrate: yellow crystals (from methanol), M.P. 205–206° C.

EXAMPLE 10

1,3-di-(tert.hexylamino)-isopropyl methacrylate

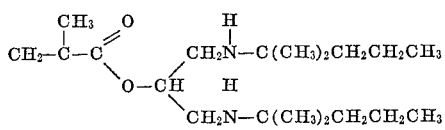

In the same manner as disclosed in Example 1, 25.8 g. of 1,3-di-(tert.hexylamino)-isopropanol is reacted with 30 g. of methyl methacrylate in the presence of 2 g. of diphenyl-paraphenylenedamine and sodium methoxide to give 18.6 g. of 1,3-di-(tert.hexylamino)-isopropyl methacrylate (57.7% of the theoretical amount); B.P. 101–103° C./0.5 mm.; $n_D^{20}$ 1.4570; $d_4^{20}$ 0.9042. $MR_D$ 98.40; $MR_{calcd.}$ 98.33.

*Analysis.*—Found (percent): N, 8.50; 8.72. Calcd. for $C_{19}H_{38}N_2O_2$ (percent): N, 8.57.

Neutralization equivalent found, 162; neutralization equivalent calcd., 163.

Dipicrate: yellow crystals (from methanol); M.P. 202–203° C.

EXAMPLE 11

1-diethylamino-3-diallylamino-isopropyl acrylate

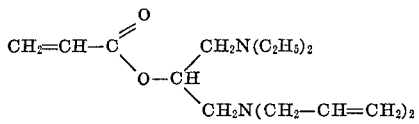

In the same manner as disclosed in Example 6, 9 g. of acryloyl chloride and 18.1 g. of 1-diethylamino-3-diallylaminoisopropanol give 20.5 g. of 1-diethylamino-3-diallylamino-isopropyl acrylate (91.5% of the theoretical amount); B.P. 91.5° C./0.4 mm.; $n_D^{20}$ 1.4622; $d_4^{20}$ 0.9249. $MR_D$ 84.00; $MR_{calcd.}$ for $C_{16}H_{28}N_2O_2$ (percent): N, 9.99.

EXAMPLE 12

1-diethylamino-3-(N-piperidyl)-isopropyl acrylate

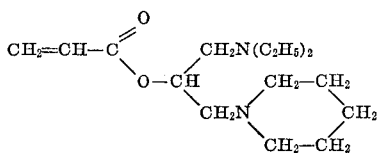

In the same manner as disclosed in Example 6, 21.4 g. of 1-diethylamino-3-(N-piperidyl)-isopropanol and 9.9 g. of acryloyl chloride yield 25.3 g. of 1-diethylamino-3-(N-piperidyl)-isopropyl acrylate (84.4% of the theoretical amount); B.P. 93–94° C./0.4 mm.; $n_D^{20}$ 1.4693; $d_4^{20}$ 0.9553. $MR_D$ 78.29; $MR_{calcd.}$ 78.34.

*Analysis.*—Found (percent): N, 10.03. Calcd. for $C_{15}H_{28}N_2O_2$ (percent): N, 10.42.

EXAMPLE 13

1-diethylamino-3-(N-piperidyl)-isopropyl methacrylate

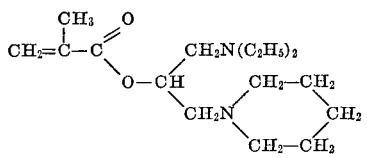

In the same manner as disclosed in Example 6, 7.8 g. of acryloyl chloride and 15.77 g. of 1-diethylamino-3-(N-piperidyl)isopropanol give 18.2 g. of 1-diethylamino-3-(N-piperidyl)isopropyl methacrylate (88.5% of the theoretical amount); B.P. 98–100° C./0′5 mm.; $n_D^{20}$ 1.4684; $d_4^{20}$ 0.9431. $MR_D$ 83.28; $MR_{calcd.}$ 83.155.

*Analysis.*—Found (percent): N, 10.15; 10.30. Calcd. for $C_{16}H_{30}N_2O_2$ (percent): N, 9.94.

EXAMPLE 14

1-diethylamino-3-(N-morpholyl)-isopropyl methacrylate

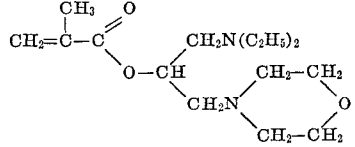

In the transesterification reaction vessel described in Example 1, are placed 24.4 g. of 1-diethylamino-3-(N-morpholyl)isopropanol, 34 g. methyl methacrylate, 1 g. of diphenyl-paraphenylenediamine, and 0.5 ml. of a 25% solution of sodium methoxide in dry methanol. The reaction mixture is heated on an oil bath so that the azeotropic mixture of methanol and methyl methacrylate distils at a vapor temperature of 64–65° C. Next 0.3 ml. of the catalyst solution is added to the reaction mixture in 0.1 ml. portions every 15–20 minutes. The reaction is completed within 1 hour. The mixture is filtered and distilled in vacuum. The yield of 1-diethylamino-3-(N-morpholyl)isopropanol methacrylate is 24.4 g. (75.5% of the theoretical amount); B.P. 115–116° C./0.7 mm.; $n_D^{20}$ 1.4690.

*Analysis.*—Found (percent): N, 9.50; 9.74. Calcd. for $C_{15}H_{28}N_2O_3$ (percent): N, 9.84.

EXAMPLE 15

2-[N-methyl-N-(2-dimethylaminoethyl)-amino]-ethyl methacrylate

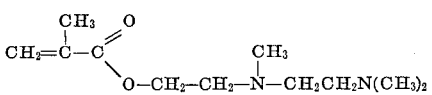

In the same manner as dislcosed in Example 1, 72 g. of 2-[N-methyl-N-(2-dimethylaminoethyl)-amino]-ethanol and 150 g. of methyl methacrylate give 96.6 g. of the corresponding diamino ester (90.2% of the theoretical amount); B.P. 96.5° C./4 mm.; $n_D^{20}$ 1.4557; $d_4^{20}$ 0.9405. $MR_D$ 61.90; $MR_{calcd.}$ 62.06.

*Analysis.*—Found (percent): N, 12.88; 12.99. Calcd. for $C_{11}H_{22}N_2O_2$ (percent): N, 13.07.

EXAMPLE 16

2-[N-methyl-N-(2-dimethylaminoethyl)-amino]-ethyl acrylate

In the transesterification reaction vessel described in Example 1 are placed 72 g. of 2-[N-methyl-N-(2-dimethylaminoethyl)-amino]-ethanol, 129 g. of methyl acrylate, 1 g. of para-hydroxydiphenylamine and 5 g. of titanium tetra-n-butoxide. The reaction mixture is heated with concomitant distillation of the azeotropic mixture of the methanol formed and methyl acrylate at a vapor temperature of 62.5–64° C. The amount of methanol collected equals 14.6 g. (91% of the theory). Excess methyl acrylate is distilled under reduced pressure produced by a water-jet pump, and the residue is distilled in vacuum through a short rectifying column to yield 85.7 g. of 2-[N-methyl-N-(2-dimethylaminoethyl)-amino]-ethyl acrylate (85.7% of the theoretical amount); B.P. 89–92° C./6 mm.; $n_D^{20}$ 1.4552; $d_4^{20}$ 0.9495. $MR_D$ 57.25; $MR_{calcd.}$ 57.45.

*Analysis.*—Found (percent): N, 13.73; 13.82. Calcd. for $C_{10}H_{20}N_2O_2$ (percent): N, 13.95.

Dimethiodide: M.P. 176–179° C. (with decomp.).

*Analysis.*—Found (percent): I, 52.40; N, 5.32. Calcd. for $C_{12}H_{26}I_2N_2O_2$ (percent): I, 52.42; N, 5.78.

EXAMPLE 17

2-[N-methyl-N-(2-dimethylaminoethyl)-amino]-ethyl acrylate

In the same manner as disclosed in Example 16, 17.4 g. of 2-[N-methyl-N-(2-diethylaminoethyl)-amino]-ethanol and 25.8 g. of methyl acrylate yield 18.4 g. of the corresponding diamino ester (80.7% of the theoretical amount); B.P. 109–110° C./6 mm.; $n_D^{20}$ 1.4540; $d_4^{20}$ 0.9257. $MR_D$ 66.80; $MR_{calcd}$. 66.68.

*Analysis.*—Found (percent): N, 12.16; 12.32. Calcd. for $C_{12}H_{24}N_2O_2$ (percent): N, 12.27.

EXAMPLE 18

2-[N-allyl-N-(2-diethylaminoethyl)-amino]-ethyl acrylate

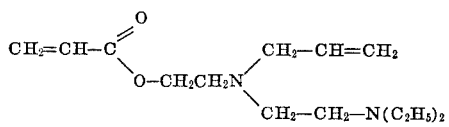

Into the transesterification reaction vessel are placed 20.0 g. of 2-[N-allyl-N-(2-diethylaminoethyl)-amino]-ethanol, 34.4 g. of methyl acrylate and 1 g. of diphenyl-para-phenylenediamine. The reaction mixture is brought to boiling and a few grams of methyl acrylate are allowed to distil in order to remove the traces of moisture that might be present in the mixture; then 1 g. of titanium tetraisopropoxide is added to the reaction mixture and, within several minutes, the vapor temperature drops to the boiling point of the azeotropic mixture of methanol and methyl acrylate. Within 65 minutes, there distils 7.1 g. of the azeotropic mixture containing 2.92 g. of methanol, so that the transesterification is 93.3% complete. The reaction products are distilled in vacuum to yield 19.3 g. of the corresponding diamino ester (75.8% of the theoretical amount): B.P. 107–109° C./2 mm.; $n_D^{20}$ 0.9338. $MR_D$ 75.14; $MR_{calcd}$. 75.45.

*Analysis.*—Found (percent): N, 12.66. Calcd. for $C_{14}H_{26}N_2O_2$ (percent): N, 12.88.

EXAMPLE 19

2-[N,N-bis-(2-diethylaminoethyl)amino]-ethyl acrylate

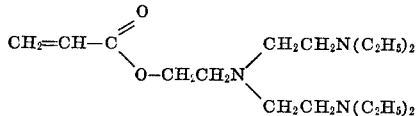

To a solution of 10 g. of acryloyl chloride in 50 ml. of dry acetonitrile is added within 20 minutes, with stirring, a solution of 25.9 g. of 2-[N,N-bis-(2-diethylaminoethyl)-amino]-ethanol in 25 ml. of acetonitrile, the temperature of the mixture being maintained below 50° C. The mixture is boiled for an additional hour, cooled to room temperature, and to it is added 4.5 g. of dry powdered sodium hydroxide, the mixture being stirred until the powder dissolves completely. Sodium chloride that precipitates is removed by filtration, to the filtrate is added 0.1 g. of phenothiazine, the solvent is distilled off, and fractionation of the residue in vacuum yields 23.6 g. of the corresponding triamino ester (75.4% of the theoretical amount); B.P. 145–149° C./0.8–0.9 mm.; $n_D^{20}$ 1.4650.

*Analysis.*—Found (percent): N, 13.67; 13.71. Calcd. for $C_{17}H_{35}N_3O_2$ (percent): N, 13.41.

EXAMPLE 20

3-[N,N-bis-(2-dimethylaminoethyl)-amino]-propyl methacrylate

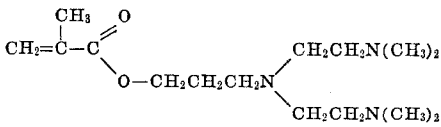

Into the transesterification reaction vessel are placed 21.7 g. of 3-[N,N - bis - (2-dimethylaminoethyl)-amino]-propanol, 30 g. of methyl methacrylate, 0.3 g. of phenothiazine, and 1 g. of titanium tetra-n-butoxide. The reaction mixture is heated and the azeotropic mixture of methanol and methyl methacrylate distils at 64–65° C. so that 2.88 g. (90% of the theory) of methanol collects during 45 minutes. Vacuum distillation of the reaction products gives 22.9 g. of 3-[N,N-bis-(2-dimethylaminoethyl)-amino]-propyl methacrylate in the form of a colorless liquid; B.P. 90–93° C./1 mm.; $n_D^{20}$ 1.4576.

*Analysis.*—Found (percent): N, 14.46; 14.37. Calcd. for $C_{15}H_{31}N_3O_2$ (percent): N, 14.72.

EXAMPLE 21

3-[N,N-bis-(2-diethylaminoethyl)-amino]-propyl methacrylate

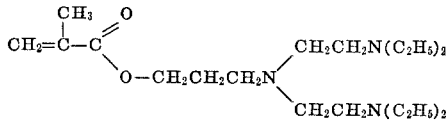

In the same manner as disclosed in Example 20, 13.7 g. of 3-[N,N-bis-(2-diethylaminoethyl)-amino]-propanol and 20 g. of methyl methacrylate in the presence of 1 g. of titanium tetra-n-butoxide and 0.2 g. of phenothiazine give 12.6 g. of the corresponding triamino ester (74.2% of the theoretical amount); B.P. 130–134° C./0.5 mm.; $n_D^{20}$ 1.4680; $d_4^{20}$ 0.9190. $MR_D$ 103.3; $MR_{calcd}$. 102.95.

*Analysis.*—Found (percent): N, 12.41; 12.48. Calcd. for $C_{19}H_{39}N_3O_2$ (percent): N, 12.30.

EXAMPLE 22

3-[N,N-bis-(2-diethylaminoethyl)-amino]-propyl acrylate

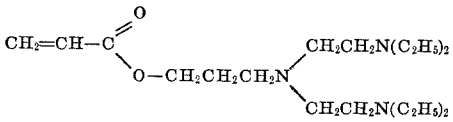

To a solution of 5 g. of acryloyl chloride in 30 ml. of anhydrous dimethylformamide placed in the reaction vessel described in Example 2, is added, with stirring, in the course of 20 minutes a solution of 13.65 g. of 3-[N,N-bis-(2-diethylaminoethyl)-amino]-propanol in an equal volume of dimethyl formamide. The temperature of the reaction mixture rises from room temperature to 50° C. The reaction mixture is then heated to 100° C. and stirred for an additional 30 minutes, followed by cooling and adding to it a solution of 3 g. of sodium hydroxide in 4 ml. water. The sodium chloride that precipitates is filtered off, and the filtrate is fractionated in vacuum to yield 12.55 g. of 3-[N,N-bis-(2-diethylaminoethyl)-amino] - propyl acrylate (76.8% of the theoretical amount); B.P. 139–142° C./0.6 mm.; $n_D^{20}$ 1.4670; $d_4^{20}$ 0.9292. $MR_D$ 97.81; $MR_{calcd}$. 98.33.

*Analysis.*—Found (percent): N, 12.82; 12.85. Calcd. for $C_{18}H_{37}N_3O_2$ (percent): N, 12.83.

We claim:

1. An ester having the formula:

$$CH_2=\underset{R}{C}-\underset{\|}{\overset{O}{C}}-O-A$$

wherein R is hydrogen or methyl; A is

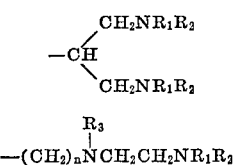

$$-(CH_2)_n\overset{R_3}{\underset{|}{N}}CH_2CH_2NR_1R_2$$

or

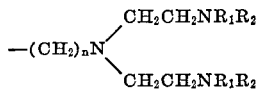

—$NR_1R_2$ is tert-$C_4H_9NH$—, tert-$C_6H_{13}NH$—, $(CH_2)_2N$— $(C_3H_5)_2N$— or $(CH_2=CH-CH_2)N$—; $R_3$ is methyl or allyl, and $n$ is 2 or 3.

No references cited.

ALEX MAZEL, Primary Examiner

J. TOVAR, Assistant Examiner

U.S. Cl. X.R.

260—2.1, 89.5, 247.2, 294.3.

UNITED STATES PATENT OFFICE
CERTIFICATE OF CORRECTION

Patent No. 3,586,711          Dated June 22, 1971

Inventor(s) Mikhail Alexeevich Korshunov, et al

It is certified that error appears in the above-identified patent and that said Letters Patent are hereby corrected as shown below:

Column 16, line 7: change "$(CH_2)_2N-$" to --$(CH_3)_2N-$,-- line 8: change "$(C_3H_5)_2N-$" to --$(C_2H_5)_2N-$ --

Signed and sealed this 6th day of August 1974.

(SEAL)
Attest:

McCOY M. GIBSON, JR.          C. MARSHALL DANN
Attesting Officer              Commissioner of Patents